(12) United States Patent
Bowdish et al.

(10) Patent No.: US 9,303,905 B2
(45) Date of Patent: Apr. 5, 2016

(54) SELF GENERATING POWER GENERATOR FOR CRYOGENIC SYSTEMS

(71) Applicants: Boyd Bowdish, Los Gatos, CA (US);
William Moon, Provo, UT (US)

(72) Inventors: Boyd Bowdish, Los Gatos, CA (US);
William Moon, Provo, UT (US)

(73) Assignee: Reflect Scientific Inc., Orem, UT (US)

( * ) Notice: Subject to any disclaimer, the term of this patent is extended or adjusted under 35 U.S.C. 154(b) by 135 days.

(21) Appl. No.: 14/279,288

(22) Filed: May 15, 2014

(65) Prior Publication Data
US 2015/0330679 A1    Nov. 19, 2015

(51) Int. Cl.
| | |
|---|---|
| F25B 27/02 | (2006.01) |
| B60H 1/00 | (2006.01) |
| B60P 3/20 | (2006.01) |
| F01N 5/04 | (2006.01) |
| F25D 17/04 | (2006.01) |
| F25D 3/10 | (2006.01) |

(52) U.S. Cl.
CPC ............ *F25B 27/02* (2013.01); *B60H 1/00014* (2013.01); *B60P 3/20* (2013.01); *F01N 5/04* (2013.01); *F25D 3/10* (2013.01); *F25D 17/042* (2013.01)

(58) Field of Classification Search
CPC ........ F25B 27/02; B60H 1/00; B60H 1/0001; B60P 3/20; F25D 3/10; F25D 17/042; F25D 17/04; F01N 5/044
USPC .................. 62/239, 434, 438, 6, 53.2; 60/597
See application file for complete search history.

(56) References Cited

U.S. PATENT DOCUMENTS

| | | | | |
|---|---|---|---|---|
| 3,512,370 | A * | 5/1970 | Murphy .................. | F25D 16/00 62/332 |
| 4,112,706 | A * | 9/1978 | Brister .................. | F16L 55/103 62/138 |
| 4,186,562 | A * | 2/1980 | Tyree, Jr. ................. | F25D 3/10 62/165 |
| 4,819,454 | A * | 4/1989 | Brigham .................... | F17C 9/02 60/618 |
| 5,305,825 | A * | 4/1994 | Roehrich .............. | F25D 29/001 165/61 |
| 5,458,188 | A * | 10/1995 | Roehrich ............. | B60H 1/3202 165/61 |
| 5,660,046 | A * | 8/1997 | de Langavant .......... | F25D 3/105 62/239 |
| 5,901,572 | A * | 5/1999 | Peiffer ..................... | B60H 1/00 165/104.12 |
| 6,062,030 | A * | 5/2000 | Viegas .................... | B60H 1/323 62/175 |
| 6,202,434 | B1 * | 3/2001 | Hearne, Jr. ............. | A23B 4/068 62/304 |
| 6,804,996 | B2 * | 10/2004 | Bezerko .............. | G01M 13/005 73/114.68 |
| 2007/0101716 | A1 * | 5/2007 | Tafas .................... | F01K 23/065 60/618 |
| 2007/0251685 | A1 * | 11/2007 | Viegas ............... | B60H 1/00014 165/202 |
| 2009/0133419 | A1 * | 5/2009 | Matsuno ................... | B60P 3/20 62/239 |
| 2009/0322096 | A1 * | 12/2009 | Errera ....................... | F01N 5/04 290/1 A |

* cited by examiner

*Primary Examiner* — Mohammad M Ali
(74) *Attorney, Agent, or Firm* — Tran & Associates

(57) ABSTRACT

A cryogenic system to remove energy includes a heat engine to store content at a predetermined temperature; one or more fans to deliver air flow through the heat engine; a cryogenic storage unit to store cryogen and having one or more insulated pipes thermally coupled to the heat engine to cool the heat engine; one or more reuse pipes coupled to one or more insulated pipes to send a portion of cryogen gas flow back to the cryogenic storage for reuse; a controller to maintain the predetermined temperature; and an on-board power generator to supply operating power to the controller and the one or more fans.

20 Claims, 9 Drawing Sheets

SELF GENERATING POWER GENERATOR FOR CRYOGENIC SYSTEMS

The present invention relates to power generation for systems with cryogenic elements while removing environmental pollutants.

BACKGROUND OF THE INVENTION

Due to an increasing demand for technology that is both electrically efficient and environmentally responsible, there exists a need to develop technologies that address the cooling of environments such as Data Centers or other IT operations, thermal stress test chamber, or a Logistical Delivery Transport truck. In refrigerated trucks or trailers which commonly transport sensitive food products, refrigeration failure can be costly in terms of food spoilage and business disruption. Excursions in temperature or outright failure may be catastrophic in the biomedical field. For example, the destruction of a limited supply of special vaccine, stored under very low temperature for emergency protection of the general public, is highly undesirable.

These trucks typically require extra energy to support different sub-systems on the truck, such as electronics for monitoring of refrigerator operation, spoilage control, GPS tracking and others.

For example, in reefer containers, computers precisely control temperatures throughout transit. The microprocessor-based control units allow for accuracy within $+/-0.4°$ F. ($+/-0.25°$ C.) of the temperature's set point for chilled commodities. For frozen commodities, the advanced refrigeration systems can maintain subzero $°$ F. in all environments encountered in international trade.

Self-diagnostic units with the latest microprocessor controller are designed to record transit temperatures and equipment performance every hour, and retain historic data in memory for a minimum of one year. The reefer microprocessor data recorder will also monitor all the four temperature sensors that include two supply-air and two return-air sensors, as well as any changes or events that might occur during transit. The electronic data recorder will continue to record temperature readings using a backup battery even when reefers are unplugged in the event of port transshipment.

Conventional trucks use a gas powered electric generator onboard the truck. However, such gas powered electric generator pollutes the environment and needs periodic refueling, which can be a hassle for the drivers. If the gas powered generator runs out of gas, drastic problems can occur for items transported by the reefer.

Given recent trends to be environmentally responsible with the use of electrical power and to reduce the carbon footprint of vehicular operations, other forms of electrical energy generation for the reefer trucks are needed.

SUMMARY

In one aspect, a cryogenic system to remove energy includes a heat engine to store content at a predetermined temperature; one or more fans to deliver air flow through the heat engine; a cryogenic storage unit to store cryogen and having one or more insulated pipes thermally coupled to the heat engine to cool the heat engine; one or more reuse pipes coupled to one or more insulated pipes to send a portion of cryogen gas flow back to the cryogenic storage for reuse; a controller to maintain the predetermined temperature; and an on-board power generator to supply operating power to the controller and the one or more fans.

In another aspect, a movable platform with cryogenic cooling is presented. The system includes a movable platform; a heat engine positioned on the movable platform to store content at a cool temperature; one or more fans to deliver air flow through the heat engine; a cryogenic storage unit to store cryogen and having one or more insulated pipes thermally coupled to the heat engine to cool the heat engine; a control valve coupled to the one or more insulated pipes to receive gaseous flow; a reuse valve coupled to the control valve to send a portion of the cryogen gas flow back to the cryogenic storage for reuse; a controller coupled to the valves to maintain a predetermined temperature; and an on-board power generator positioned on the movable platform to supply operating power to the controller and the valves.

In another aspect, a cryogenic self powered system includes a cryogenically cooled chamber having a heat exchanger expelling an exhaust gas therefrom and a power generator coupled to the heat exchanger to use the exhaust gas to generate electricity.

In yet another aspect, electrical requirements are provided by a non-polluting cryogenic system which takes the exhaust of the heat exchanger of the reefer unit and uses the natural thermal properties of the effluent as a generator fuel. The exhaust gas is used to turn a turbine type generator, which in turn charges batteries that then supply current to electrical requirements.

In another aspect a turbine/vaporizer is used to directly connect the liquid source to the electrical generator.

In another aspect, the electrical generation is substantial enough to power conventional refrigeration devices. This embodiment acts as a direct replacement for the diesel engines in powering the refrigeration device while being environmentally clean and non-polluting.

In yet another aspect, a reliquifying device reclaims the vaporized liquid nitrogen, thus significantly reducing the overall consumption of liquid nitrogen.

Implementations of the system may include one or more of the following. The system uses refrigerated air as a fuel source for an energy removal process that fully utilizes the enthalpatic potential of the fuel source, using the air within the payload bay to vaporize the refrigerated air. The state change is captured by a dual acting vaporizer/heat sink assembly. The gaseous exhaust, which is again just air, is not released to the feed stock until such a point that its temperature equals the desired setpoint for environmental conditions in the payload area. With this simple algorithm, the full enthalpatic potential of the refrigerated air is realized which maximizes fuel efficiency. The technology is simple in its design, reducing repair cost significantly. This technology only has a few moving parts and uses the self-pressurizing nature of refrigerated air to produce fuel flow.

The system provides a systematic way of taking a cryogenic element that is used in a cryogenic process and using it to create the electrical power required for the cryogenic process. In one embodiment, the effluent exhaust from the cryogenic refrigeration is recycled into electricity in an environmentally clean manner. In another embodiment, through the use of cryogenically cooled Sterling engine, the need for an external electrical power source is eliminated. The cryogenic processes is environmentally beneficial by eliminating the external electrical power requirement, which, based on average electrical grid compositions is usually associated with the generation of carbon emissions. By recycling or tapping into the inherent cryogenic process component, the cryogenic process becomes self-sustaining. The system does not need external power, and with a process only dependent on its inherent constituent components for operation, system reliability is improved. The system can be used for Cold Chain Management such as in Controlled Environment Transportation (CET), Biopharmaceutical Processes, Non-Profit Organizations, Governmental Agencies, and Metallurgical Processing, among others.

Advantages of the preferred embodiment may include one or more of the following. The system eliminates environmental impact from the use of diesel fueled refrigeration technology. The system uses a renewable resource, air, for the cooling of consumer food products that has zero impact on the environment. Additional advantages of this technology include the elimination noise so that a reefer can be run while at a local store and not intrude on store neighbors. Also, with the elimination of the exhaust gases from diesel fueled, payloads can be safely kept cool at large distribution centers, thus eliminating the localized high pollution and aiding in the processing of products through the terminal while reducing over-time and employee stress from commuting to a remote location. The system is inherently safe from exposure to the refrigerated air by not exposing user or product to very cold surfaces. There is no introduction of system fuel into the payload bay. All system components are housed outside of the payload bay and within a locked and interlocked cover.

DESCRIPTION

Figure 1A:
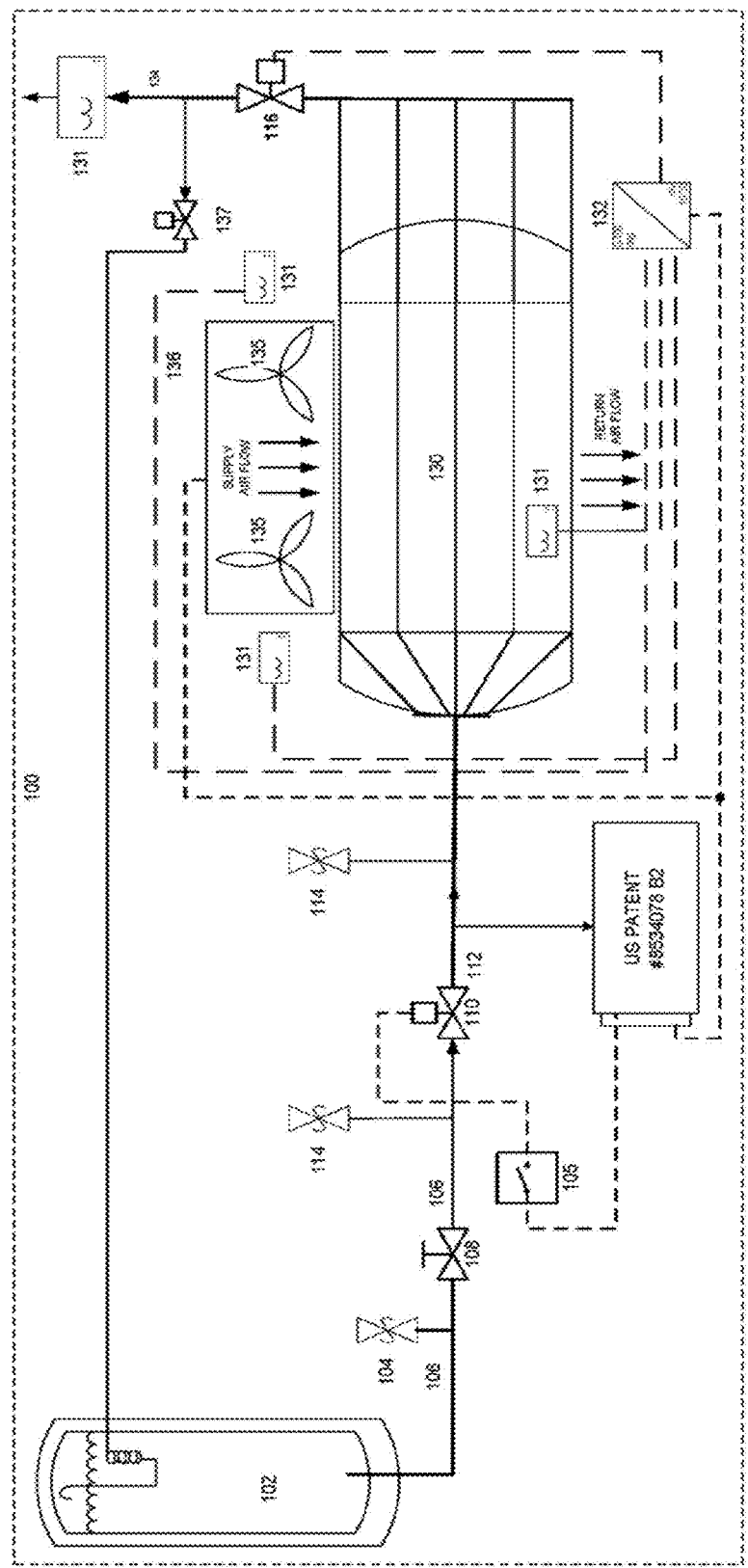
FIG. 1A shows an exemplary cryoaire system.

FIG. 1A shows an exemplary cryoaire system 100. The system 100 includes a cryogenic storage unit 102 which sends cryogen through a pipe to a relief valve 204 and a manual shutoff valve 108. From the valve 108, cryogen flows through a vacuum insulated pipeline 106 and is received by an electromotive proportional (EMO) valve 110 and one or more relief valves 114. The EMO valve drive includes integrated bus coupler 105 and microprocessor control with automatic valve lift detection. After exiting from the EMO valve 110, cryogen is delivered to a heat engine 130 with one or more thermocouples 131, some of which senses reuse lines 136. One or more fans 135 provides air flow for the heat engine 130. The cryogen cools the contents in the heat engine 130 and eventually exits the heat engine 130 through a gas control valve 116, which is controlled by a PID controller 132 that processes engine temperature, return air flow and other temperature information from the thermocouple sensors 131. By this point in the system the cryogen has changed state to a gas and the gaseous flow eventually exits the control valve 116 and a portion of the gas flows through a reuse valve 137 which sends the gas to the cryogenic storage for reuse. Another portion of the flow out of the valve 116 is sent to a vent line 134. The components in FIG. 1A include:

100 CRYOGENIC SYSTEM
102 CRYOGENIC STORAGE
104 RELIEF VALVE
106 VACUUM INSULATED PIPELINE
108 MANUAL SHUT OFF VALVE
110 EMO VALVE
114 RELIEF VALVE
116 CONTROL VALVE
130 VHX
132 VHX OUTLETS
131 THERMOCOUPLE
132 PID CONTROL
134 VENT LINE
135 VHX FANS
136 RELIQUIDIFCATION LINE
137 RE-LIQUIDIFCATION VALVE

The PID controller can be a proportional-integral-derivative controller which is a control loop feedback mechanism (controller) used in industrial control systems. The PID controller calculates an "error" value as the difference between a measured process variable and a desired setpoint. The controller attempts to minimize the error by adjusting the process control outputs.

The PID controller algorithm involves three separate constant parameters, and is accordingly sometimes called three-term control: the proportional, the integral and derivative values, denoted P, I, and D. These values can be interpreted in terms of time: P depends on the present error, I on the accumulation of past errors, and D is a prediction of future errors, based on current rate of change. The weighted sum of these three actions is used to adjust the process via a control element such as the position of a control valve, a damper, or the power supplied to a heating element.

The system of FIG. 1A is environmental as well as operational advantageous over conventional diesel fueled refrigeration technologies by:

Eliminating Noise
Eliminating Particulate Pollution
Eliminating polluting $CO_2$ and CO gas emissions
Uses a renewable resource as a cooling fuel
Reduces trailer load—unit weighs half of a Diesel engine unit
Reduces maintenance costs, significantly less moving parts
Improves operation conditions, at local stores or large distribution centers The system has a self generating power source-stand-alone operation at temperature with near zero emitted noise, zero emitted pollutants, and significantly longer mean time between failures. The system also eliminates regulatory concerns over carbon foot print or carbon taxes (California Air Resources Board—CARB) and eliminates defrost cycles.

In one embodiment, using a bulk supply of under 150 gallons of refrigerated air, the liquefied air is vaporized by passing it through a fin tube vaporizer using the heat from the trailer or container's interior to change the physical state of the air. The flow of the vaporized air is gated by an output valve at the exit of the vaporizer. This valve opens only when 90% of the vaporizer has reached the desired payload temperature. The exit valve is closed when 25% of the vaporizer reaches −170° C. The recalculating air is cooled by the physical contact with vaporizer. About 4000 cfm of air is rotated across the vaporizer and the output vaporized gas is then directed through plumbing back into the bulk supply, where it is re-liquefied and returned to the bulk supply, thus creating a heat engine where the fuel is liquefied air and the work is the heating of liquefied air by using thermal energy from a confined space of a logistics trailer or container and returning the, now gaseous, air bulk through the bulk supply to be re-liquefied and re-used.

The system removes a complex machine that burns fossil fuels and replaces it with a simple, efficient passive regenerating machine. Through the use of a renewable resource, refrigerated air, the elimination of particulates, CO2 and CO gases is complete. Through the use of a recycling feature, the vaporized air is re-liquefied so as to increase fuel efficiency. Waste gas produced during operation is exited back to the atmosphere for re-use.

Maintenance on the system is reduced significantly by the system being passive system. Using the self-pressurizing qualities of refrigerated air, there is no need for pumps or compressors. Re-liquefaction is done by routing engine exhaust gas back into the bulk supply, condensing the air back into liquid state, and back into the bulk supply. There are three moving parts in the system, as compared to the several thousand parts of a diesel powered refrigeration unit.

The system also avoids defrost cycles that are problematic for conventional refrigerators. Because of comparatively high temperature of a conventional trailer refrigerator cooling coil, water vapor condenses onto the cooling array of the conventional refrigerators in large bulky masses of ice. In conventional refrigeration units, the air flow across the coil is significantly limited, thus requiring a defrost cycle. In contrast, the present system does not result in large masses of ice, just powder type snow. With the present system, the temperatures are significantly colder, and when water vapor from the payload bay is directed across the vaporizer of the engine, it sublimes the water vapor resulting in a powder type condensation. Whatever buildup formed over time is quickly used as a cooling agent, thus quenching the flow of refrigeration fuel to the engine.

Figure 1B:
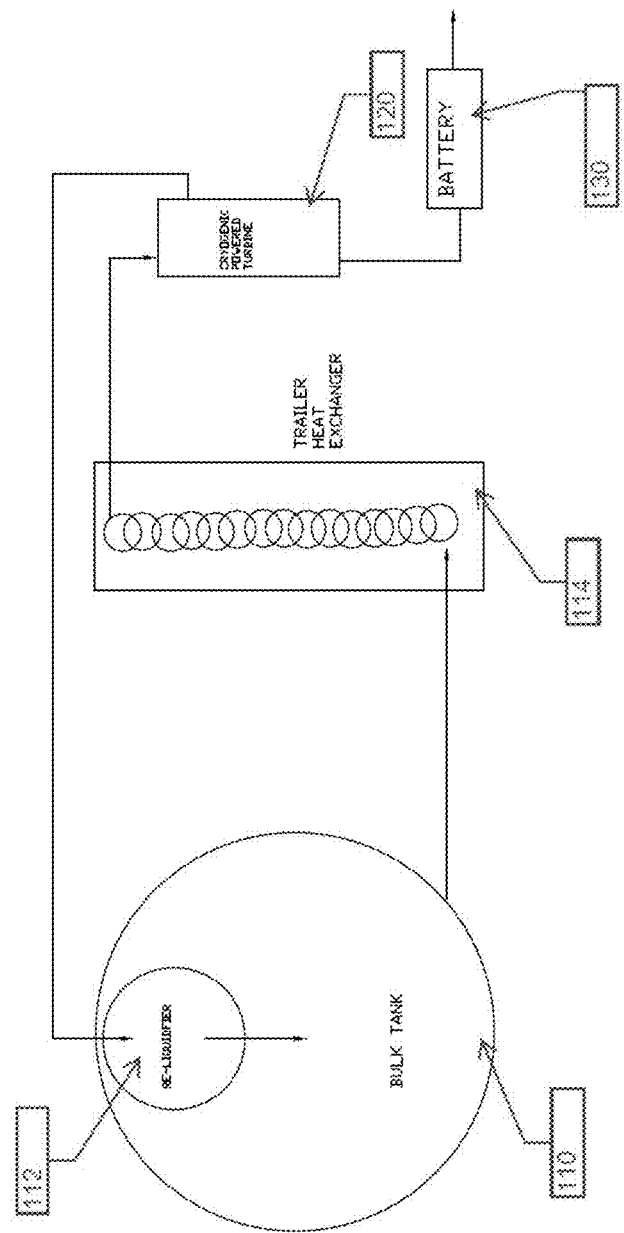
FIGS. 1B-1D show exemplary cryogenic electrical generators.
Figure 1C:
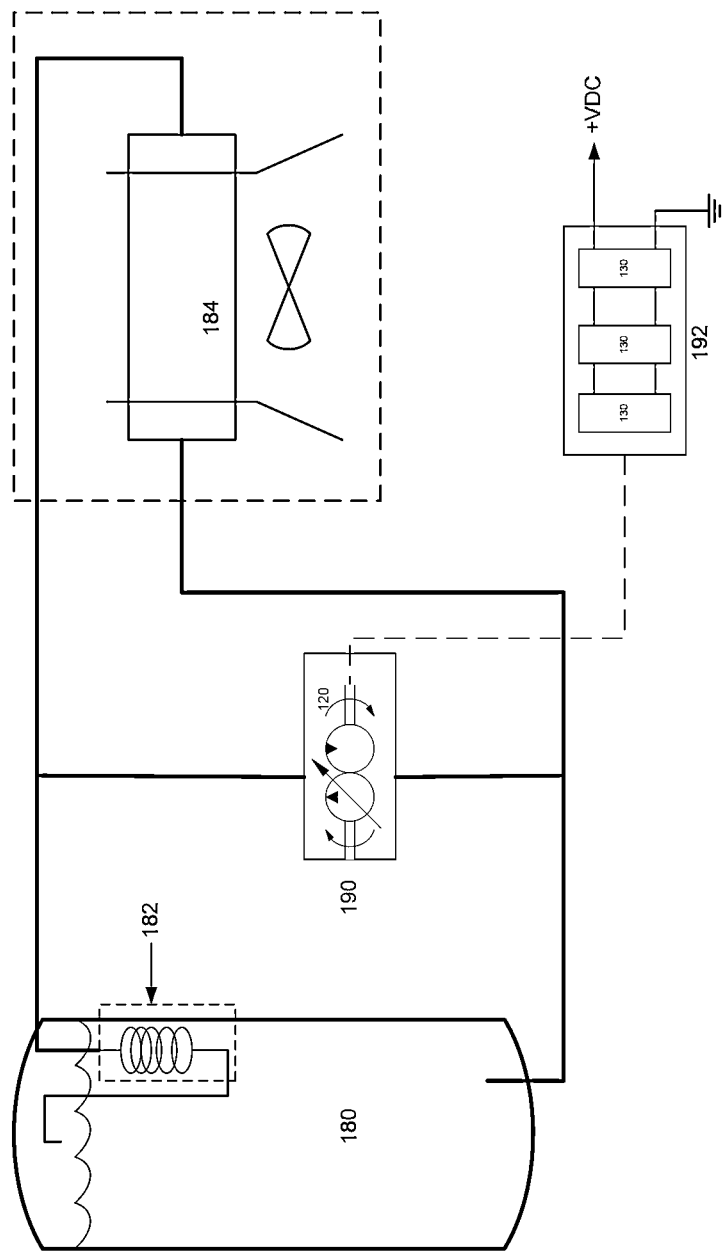
Figure 1D:
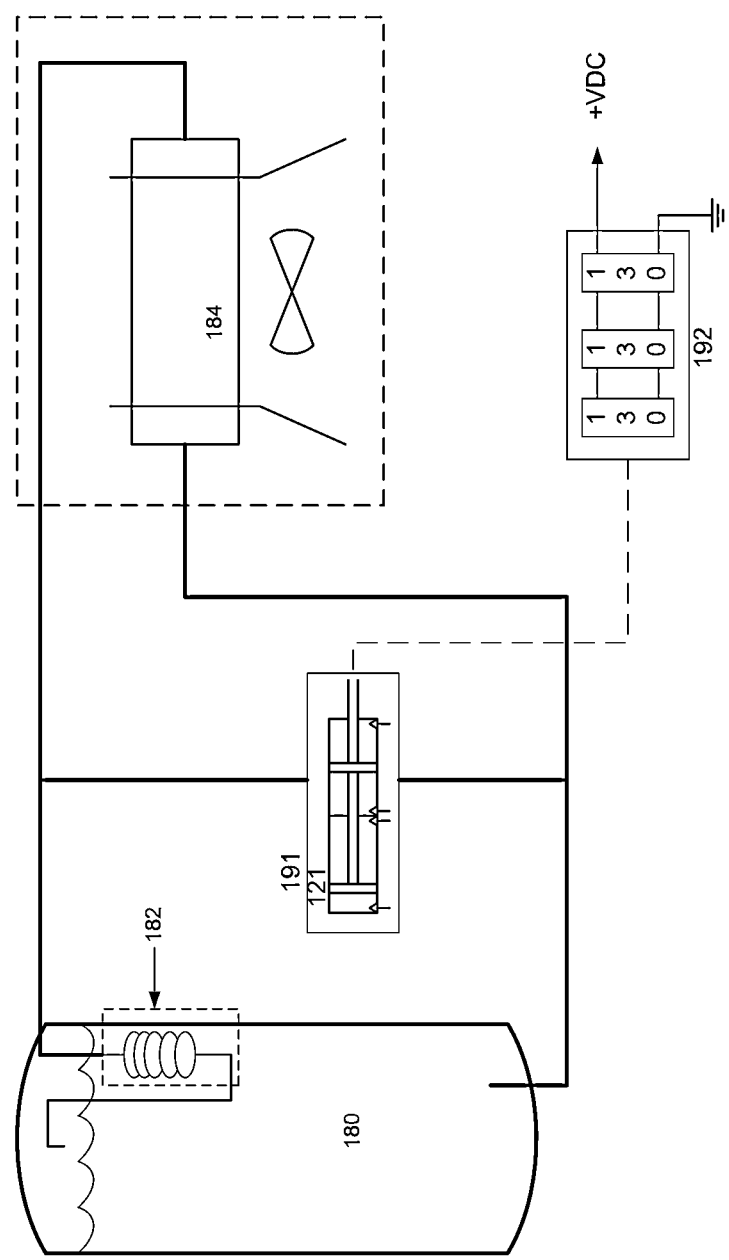

The electrical portion of the system is powered by a cryogenic electrical power generator 178 such as those disclosed in commonly owned U.S. Pat. No. 8,534,078. This system generates required electrical supply for operation of fans, oxygen monitors, enunciators and air heaters if needed. FIG. 1B shows in more detail an exemplary cryogenic electrical power generation system. Preferably, the system of FIG. 1B operates with a reefer trailer to supply the reefer's electrical requirements with a non-polluting cryogenic power source. The cryogenic processes consume a cryogenic element as a function of that work. Typically, these processes also require an electrical power source to drive operational items such as valves, controls and other components. The cryogenic processes are then dependent on having a minimum of two energy sources to operate. The system of FIG. 1B captures energy from cryogenic operation and converts the energy to electrical energy. A bulk tank 180 includes a re-liquefier 182. The bulk tank 180 provides cryogenic fluid to a trailer heat exchanger 184. The exhaust of the heat exchanger 184 of the reefer trailer contains energy in the form of enthalpy, and the natural thermal properties of the effluent are used as a generator fuel. Instead of using just raw liquid as fuel, the exhaust gas, along with the potential of using raw liquid, is used to turn a cryogenic powered engine 190 that charges one or more batteries 192. In one embodiment, the cryogenic powered engine 120 is a turbine type generator, which in turn charges batteries 130 that then supply current to electrical requirements of the reefer trailer. In another embodiment shown in FIG. 1C, a Sterling type generator 190 with rotation 120 is used to produce the required electrical power source. FIG. 1D shows an embodiment that is turbine-based generator with turbine 191 and rotation 121.

Figure 2A:
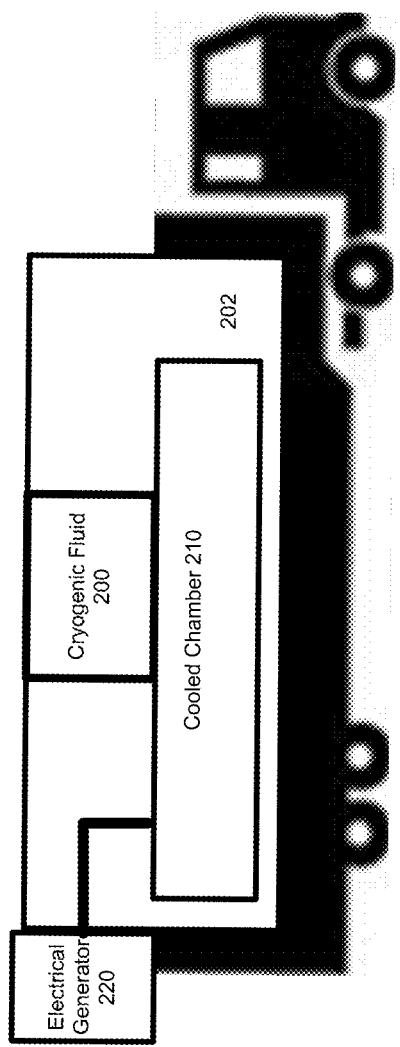
FIG. 2A shows an exemplary truck or reefer with the cryogenic electrical generator.

FIG. 2A shows an exemplary mobile cryogenic electrical generator mounted on a truck space 202. The system of FIG. 2A includes a cryogenic fluid source 200 that is pumped to cool a chamber 210. The exhaust gas from the cryogenic chamber, along with the potential of using raw liquid, is used to turn a cryogenic powered electrical generator 220. The power generator 220 can also recharge a battery/recharger which in turn supplies power and acts as an uninterruptible power source (UPS).

Figure 2C:
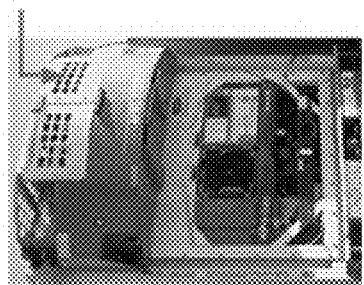
FIG. 2C shows an exemplary clip-on generator mount.
Figure 2B:
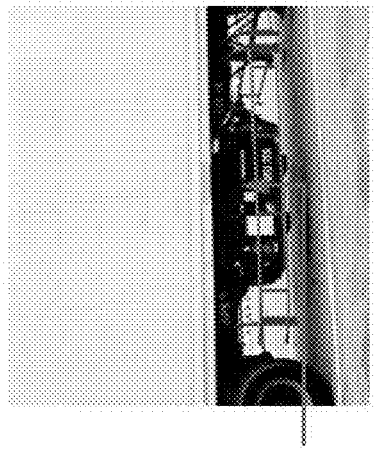
FIG. 2B shows an underslung generator for use with cargo moving on trucks mounted beneath the chassis.

FIG. 2B shows an under-slung generator for use with cargo moving on trucks mounted beneath the chassis. FIG. 2C shows an exemplary clip-on generator mount for use with refrigerated cargo moving on trains or trucks; attached to the front (nose) of the container.

In one embodiment, cryogenic processing requires a relative small amount of electrical power to operate the process control and operational components. In this embodiment, a Sterling engine based electrical power source is used to recharge a battery bank, as detailed in FIG. 4. Conventional electronics convert the direct current voltage supply of the battery bank into the required operational voltages of the cryogenic process. Battery bank capacity is process dependent. By using the Sterling engine as a recharge device, the load on the engine remains constant minimizing fuel consumption. Bulk liquid cryogen is used to "fuel" the Sterling engine.

In another embodiment, the Sterling engine based power source is used to supply the demands of the cryogenic process directly. Conventional electronics condition the output voltage supply into the required operational voltages of the cryogenic process. By using the Sterling engine as a direct supply of electrical power, a minimum of components are required, thus leading to uptime improvement for the cryogenic process while allowing the process to operate in a self-sustaining fashion.

These cryogenic processes can be for continuous operation in environments where the availability of electrical power is limited, inconsistent or non-existent. Diverse processes such as cold chain management, biopharmaceutical manufacturing, processing and storage facilities, blood plasma processing facilities and metal processing facilities are examples of applications which could benefit from the reduction of external electrical power requirements and associated impacts on costs and the environment. The creation of electrical power by using the available cryogens from the process bulk supply to generate the required electrical service allows the process to continue regardless of external factors or conditions, dependent only on the availability of the inherent cryogen The Sterling engine converts heat energy into mechanical power by alternately compressing and expanding a fixed quantity of gas (the working fluid) at different temperatures. In recent years, the advantages of Sterling engines have become increasingly significant, given the global political environment and as the engineering requirements for environmental responsibility are realized. Sterling engines address these issues by being very compatible with the renewable energy used in cryogenic processes. The Sterling engine is noted for its high efficiency, quiet operation and the ease with which it can utilize what would otherwise be wasted energy.

In this embodiment, engine initialization is realized by "fueling" the engine from a bulk liquid nitrogen tank which uses the natural fluid dynamics of a cryogen to pressurize the upstream cryogenic element. The heat exchanger of the engine has been sized appropriately to supply the necessary heat transfer rates thus producing the appropriate mechanical action necessary to produce the needed electrical current from the alternator.

With the use of liquid nitrogen as a cryogenic element, the system applies a renewable resource which after its use in the cryogenic process is returned to the "feed stock air" for future recovery and use. With the use of this technique, the cryogenic processes become environmentally responsible by eliminating the external electrical power requirement, which, based on average electrical grid compositions is usually associated with the generation of carbon emissions. By recycling or tapping into the inherent cryogenic process component, the cryogenic process becomes self sustaining.

Self servicing systems are always desirable, demonstrating an evolutionary step forward in process improvement. With a process only dependent on its inherent constituent components for operation, system reliability is improved.

Figure 3B:
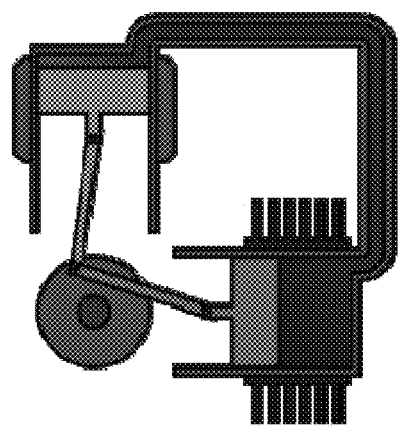
FIGS. 3A-3B shows two operating phases of an exemplary Sterling engine electric generator.
Figure 3A:
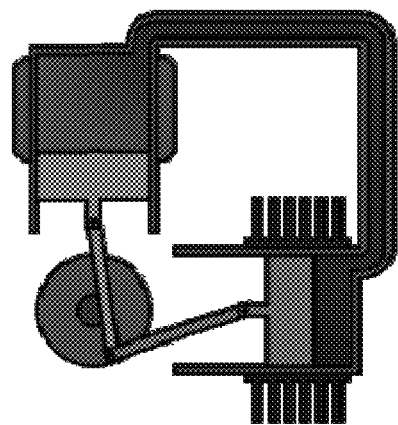

FIG. 3A-3B shows two operating phases of an exemplary Sterling engine electric generator. In one embodiment, an alpha Sterling engine is used which contains two power pistons in separate cylinders, one connected to the hot face portion and one connected to the cold face portion. The hot cylinder is situated inside a high temperature heat exchanger and the cold cylinder is situated inside a low temperature heat exchanger. Most of the working gas is in contact with the hot cylinder walls, it has been heated and expansion has pushed the hot piston to the bottom of its travel in the cylinder. The expansion continues in the cold cylinder, which is 90° behind the hot piston in its cycle, extracting more work from the hot gas. When the gas is at its maximum volume, the hot cylinder piston begins to move most of the gas into the cold cylinder, where it cools and the pressure drops. The cold piston, powered by flywheel momentum (or other piston pairs on the same shaft) compresses the remaining part of the gas. The gas reaches its minimum volume, and it will now expand in the hot cylinder where it will be heated once more, driving the hot piston in its power stroke.

In one embodiment, the Sterling engine has a regenerator which is an internal heat exchanger and temporary heat store placed between the hot and cold spaces such that the working fluid passes through it first in one direction then the other. The regeneration greatly increases the thermal efficiency by 'recycling' internally heat which would otherwise pass through the engine irreversibly. As a secondary effect, increased thermal efficiency promises a higher power output from a given set of hot and cold end heat exchangers. The regenerator works like a thermal capacitor and ideally has very high thermal capacity, very low thermal conductivity, almost no volume, and introduces no friction to the working fluid.

In a high power generation embodiment, a greater surface area is needed to facilitate the transfer of sufficient heat. Implementations of the high power embodiments can include internal and external fins or multiple small bore tubes. Preferably, heat may be supplied at ambient and the cold sink maintained at a lower temperature by the cryogenic fluid or ice water.

In another embodiment, instead of the Sterling engine, a modified gasoline engine can be used. In this embodiment, cryogenic fluid is used in lieu of gas. The cryogenic fluid then enters the expansion valve where it drops in pressure and changes state from a liquid to a vapor in the evaporator. Ambient heat causes the cryogenic fluid to expand greatly, pushing the engine's cylinder up. A vent is opened to let the gas escapes, driving the cylinder down, and then the cycle is repeated. The motion of the cylinder generates rotary power that is then applied to a dynamo or suitable electrical power generator.

Figure 4:
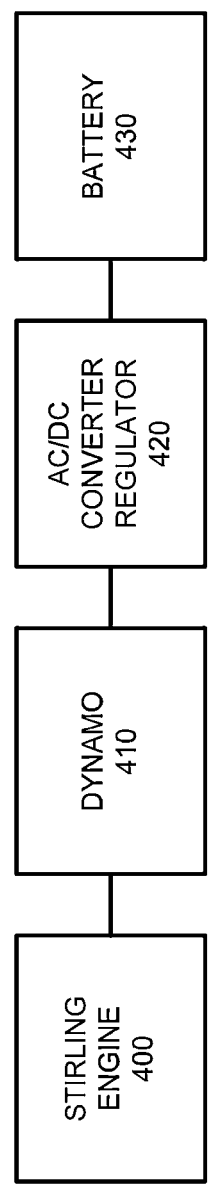
FIG. 4 shows an exemplary cryogenic Sterling engine battery recharger.

FIG. 4 shows an exemplary cryogenic Sterling engine battery recharger. The Sterling engine 400 provides rotary power which is applied to a dynamo 410 to generate electricity. The dynamo 410 is essentially an electric motor run in reverse. The electric motor uses magnets spinning in a metal coil to spin an axle. Conversely, spinning the axle causes the magnets to rotate in the coil and generates an electric current moving away from the motor. The dynamo 410 in basic form consists of a powerful field magnet between the poles of which a suitable conductor, usually in the form of a coil (armature), is rotated. The magnetic lines of force are cut by the rotating wire coil, which induces a current to flow through the wire. The mechanical energy of rotation is thus converted into an electric current in the armature. An electromotive force is developed in a conductor when it is moved in a magnetic field.

In one embodiment, the dynamo produces alternating current (AC) which is provided to an AC/DC converter and regulator 620 to generate a regulated DC voltage. The DC voltage is used to recharge a battery 630.

In one embodiment, lithium-ion batteries (sometimes abbreviated Li-ion batteries) are a type of rechargeable battery in which a lithium ion moves between the anode and cathode. The lithium ion moves from the anode to the cathode during discharge and in reverse, from the cathode to the anode, when charging. Lithium ion batteries offer one of the best energy-to-weight ratios, no memory effect, and a slow loss of charge when not in use. The three primary functional components of a lithium ion battery are the anode, cathode, and electrolyte, for which a variety of materials may be used. Commercially, the most popular material for the anode is graphite. The cathode is generally one of three materials: a layered oxide, such as lithium cobalt oxide, one based on a polyanion, such as lithium iron phosphate, or a spinel, such as lithium manganese oxide, although materials such as TiS2 (titanium disulfide) were originally used. [6] Depending on the choice of material for the anode, cathode, and electrolyte the voltage, capacity, life, and safety of a lithium ion battery can change dramatically. Lithium ion batteries are not to be confused with lithium batteries, the key difference being that lithium batteries are primary batteries containing metallic lithium while lithium-ion batteries are secondary batteries containing an intercalation anode material. Other battery chemistries are contemplated as well, including NiMH and NiCd, among others.

Figure 5:
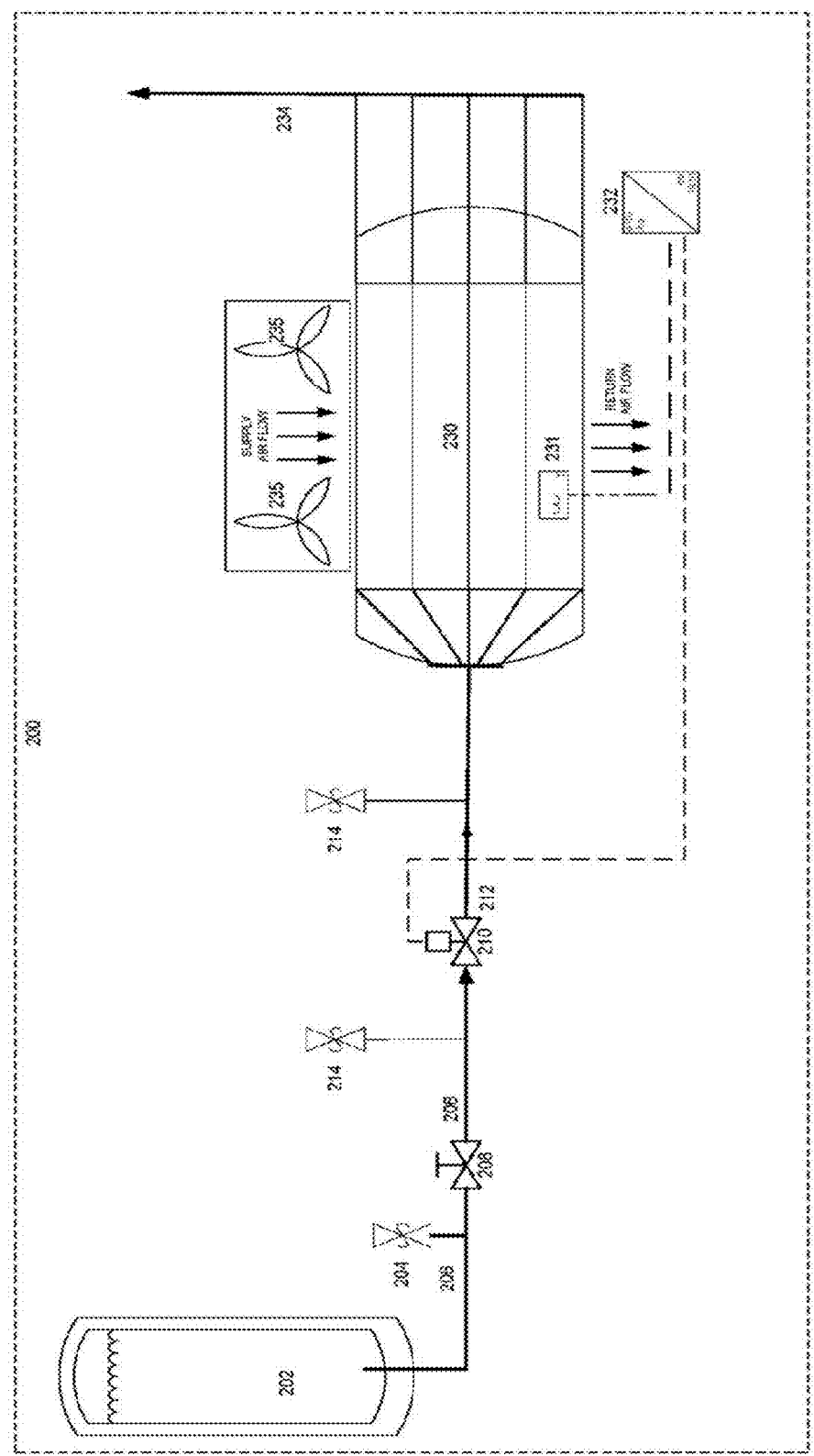
FIG. 5 shows an exemplary block diagram of a cryogenics distribution system.

FIG. 5 shows a block diagram of an exemplary cryogenic system 200 in accordance with one aspect of the invention. In this system, cryogenic liquid or material such as liquid nitrogen (LN2) is stored in a cryogenic tank 202. The tank is connected to a relief valve 104 and to a valve supply line 206. The cryogenic main feed to the redundant and control valves to the air evaporator's coil or refrigeration tubing is preferably a high reliability multi-tube thermal exchange structure as disclosed in U.S. Pat. No. 6,804,976, the content of which is incorporated by reference.

The supply line 206 can be a vacuum insulated piping (VIP) line to minimize the vaporization of the cryogens during the transfer of the cryogenic liquids due to heat gain and vaporization. With vacuum insulated piping, the vacuum insulation decreases heat gain caused from conduction, convection, or radiation. In one embodiment, a multi-layer insulation is demonstrably superior to conventional foam insulated copper piping in reducing heat gain to the transferred cryogenic flow.

Fittings for input and output connection to the air heat exchanger air conditioning and or refrigeration source are configured and welded or bayoneted with cryogenic connectors in place. Preferably, the connection between the vacuum insulated pipes is done with a bayonet connector that uses thermal contraction/expansion mechanisms. The contraction/expansion provides a mechanical connection for sections of vacuum insulated pipe with a low heat gain connection. The bayonets are constructed of stainless steel with the nose piece of the male bayonet being made from a dissimilar material such as the polymer INVAR36 to prevent mechanical seizing. A secondary o-ring seal is used at the flange of each bayonet half to provide a seal in which a gas trap is formed between the close tolerance fitting sections of the bayonet assembly. This gas trap is formed using the initial cryogen flow which is vaporized and forms a high pressure impedance for the lower pressure liquid, thus forming a frost free connection with lowered heat gain to the cryogenic flow.

A manual shut-off valve 108 is connected to the supply line 106 to allow a user to shut-off the system in case of an emergency. The LN2 liquid passes through a redundant valve 210 and enters another valve supply line 212. The supply line 212 has a relief valve 114 and is gated by a control valve 116. In one embodiment, a VIP control valve set up is provided with a redundant safety valve. The safety valve is of the EMO (emergency machine off) type, closed with power removed. The LN2 liquid then travels through a distributor 218 which evenly controls the flow of the cryogenic element over a plurality of lead tubes 220. The lead tubes 220 then complete the enthalpy control to a heat exchanger/evaporator 230 such as the Multi Tube Hi Reliability Tubing discussed in U.S. Pat. No. 6,804,976, the content of which is incorporated by reference.

The lead tubes 220 exit the heat exchanger 230 at a distributed outlet 232. A portion of the Gasses can be vented to the outside through a vent line 234. Alternatively, the exhaust from the gas exhaust can be used for a different process as Controlled atmosphere to reduce Bio-Deterioration within the payload bay or chamber within the heat source environment.

The temperature range is from ambient e.g +75 degrees Fahrenheit to −120 degrees Fahrenheit. This system controls the flow of a cryogenic element which in turn controls the enthalpic potential of said cryogenic element as it is applied to a heat source which can be Refrigerated Trailers, Environmental Chambers, and computer cooling rooms, among others.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cryogenic system to remove energy so as to remove environmental pollutants and undesirable usage issues, comprising:
    a heat engine to store content at a predetermined temperature;
    one or more fans to deliver air flow through the heat engine;
    a cryogenic storage unit to store cryogen and having one or more insulated pipes thermally coupled to the heat engine to cool the heat engine;
    one or more reuse pipes coupled to the one or more insulated pipes to send a portion of cryogen gas flow back to the cryogenic storage for reuse;
    a controller to maintain the predetermined temperature; and
    an on-board power generator to supply operating power to the controller and the one or more fans.

2. The system of claim 1, wherein the power source comprises
    a cryogenically cooled chamber having a heat exchanger expelling an exhaust gas therefrom; and
    a power generator coupled to the heat exchanger to use the exhaust gas to generate electricity.

3. The system of claim 2, wherein the power generator comprises a turbine or a Sterling engine.

4. The system of claim 3, comprising a dynamo coupled to the Sterling engine.

5. The system of claim 1, comprising a direct current converter coupled to the power generator and a rechargeable battery coupled to the power generator.

6. The system of claim 1, comprising refrigerated air as a fuel source for energy removal that fully utilizes an enthalpatic potential of the fuel source.

7. The system of claim 1, comprising using the air within the payload bay to vaporize the refrigerated air.

8. The system of claim 1, wherein the state change is captured by a dual acting vaporizer and heat sink assembly.

9. The system of claim 1, comprising a gaseous exhaust to hold air for release to a feed stock until its temperature equals a desired set-point for environmental conditions in a payload area.

10. The system of claim 1, wherein a full enthalpatic potential of refrigerated air is realized to maximize fuel efficiency using self pressurizing nature of refrigerated air to produce fuel flow.

11. The system of claim 1, wherein effluent exhaust from the cryogenic refrigeration is recycled into electricity in an environmentally clean manner.

12. The system of claim 1, wherein the cryogenic storage unit sends cryogen through a pipe to a relief valve and a manual shutoff valve.

13. The system of claim 1, wherein the cryogenic storage unit sends cryogen through a vacuum insulated pipeline, an electromotive proportional (EMO) valve, and one or more relief valves.

14. The system of claim 1, comprising one or more reuse lines to divert cryogen gas flow back to the cryogenic storage for reuse.

15. The system of claim 1, comprising one or more thermocouples to sense the one or more reuse lines, wherein the one or more thermocouples are processed by a PID controller.

16. A system, comprising:
    a movable platform;
    a heat engine positioned on the movable platform to store content at a cool temperature;
    one or more fans to deliver air flow through the heat engine;
    a cryogenic storage unit to store cryogen and having one or more insulated pipes thermally coupled to the heat engine to cool the heat engine;
    a control valve coupled to the one or more insulated pipes to receive gaseous flow;
    a reuse valve coupled to the control valve to send a portion of the cryogen gas flow back to the cryogenic storage for reuse;
    a controller coupled to the valves to maintain a predetermined temperature; and
    an on-board power generator positioned on the movable platform to supply operating power to the controller and the valves.

17. The system of claim 16, wherein the power generator comprises a self generating electrical power source for cryogenic processes.

18. The system of claim 16, wherein the heat engine comprises a heat exchanger with effluent, wherein the heat exchanger's effluent is used as a generator fuel.

19. The system of claim 16, comprising a turbine and vaporizer that directly connects a cryogenic liquid source to the power generator.

20. The system of claim 16, comprising a re-liquefying device to reclaim vaporized liquid nitrogen.

* * * * *